March 15, 1927.  
G. MARLSDALE  
1,620,907  
PLANTER AND FERTILIZER DISTRIBUTING DEVICE  
Filed Sept. 10, 1924  
6 Sheets-Sheet 1

Fig.1.

INVENTOR  
George Marlsdale  
BY *James N. Ramsey*  
ATTORNEY

March 15, 1927.

G. MARLSDALE 1,620,907

PLANTER AND FERTILIZER DISTRIBUTING DEVICE

Filed Sept. 10, 1924    6 Sheets-Sheet 4

INVENTOR
George Marlsdale
BY
ATTORNEY

March 15, 1927.  G. MARLSDALE  1,620,907
PLANTER AND FERTILIZER DISTRIBUTING DEVICE
Filed Sept. 10, 1924  6 Sheets-Sheet 5

INVENTOR
GEORGE MARLSDALE
BY James N. Ramsey
ATTORNEY

Patented Mar. 15, 1927.

1,620,907

UNITED STATES PATENT OFFICE.

GEORGE MARLSDALE, OF CINCINNATI, OHIO.

PLANTER AND FERTILIZER-DISTRIBUTING DEVICE.

Application filed September 10, 1924. Serial No. 736,980.

My invention relates to mechanism, particularly adapted to simultaneously and automatically plant potatoes and distribute fertilizer.

Heretofore it has been customary to plant potatoes by the use of mechanism adapted to bruise or otherwise injure or misplant the potatoes or by the use of mechanism inefficient in operation and requiring the services of two or more men and adapted to distribute the fertilizer without economical results being attained.

The objects of my invention are to provide efficient, practical and economical means adapted to automatically and simultaneously plow furrows in the ground, drop potatoes in spaced apart relation in the furrows, distribute fertilizer and cover the potatoes and fertilizer with earth; to provide adjustable means adapted to distribute fertilizer over a desirable area of ground relative to the position of the planted potatoes; to provide adjustable means adapted to plant part or whole potatoes of varying sizes; to provide means adapted to agitate the potatoes thereby preventing bridging of the same in the hopper, whereby misplanting of the potatoes is avoided; to provide means adapted to prevent more than one potato being planted or dropped at one time; to provide means adapted to plant potatoes without bruising, cutting or otherwise damaging them; and to provide an arrangement of mechanism and parts particularly desirable and adapted for convenience of the operator of the machine.

My invention consists in providing a combination, arrangement and location of parts, comprising mechanism particularly adapted to automatically plant potatoes and distribute fertilizer efficiently without bruising or damaging the potatoes and having adjustable mechanism whereby various advantageous results are accomplished, as herein set forth and claimed.

In the preferred construction of my invention I provide a potato hopper 1 having the lower portion 2 of rear side 3 inclined downwardly and inwardly for the purpose of permitting the potatoes, by force of gravitation, to rest on bottom 4 in close proximity to front 5 of hopper 1 suitably fixed to the rear portion of frame 6 and extending transversely thereof. The bottom 4 of the hopper is provided with rectangular holes 7 and 7' for receiving upwardly projecting agitating arms 8 and 8', respectively, connected with eccentrics 144 respectively, fixed in spaced apart relation to rear driving shaft 10 having its outer ends suitably journaled in frame 6. In operation the upper portions 11 and 11', respectively, of arms 8 and 8' move slowly circularly, thereby preventing bridging and bruising of the potatoes in the hopper. The bottom of the hopper is also provided with rectangular aperture 12 intermediate holes 7 and 7' and in alinement with aperture 13 in front 5 of the hopper. Feed wheel 14 fixed to rear driving shaft 10 has its upper portion thereof extending through apertures 12 and 13. The feed wheel has spaced apart outwardly extending flanges 15 and 15' around the outer periphery thereof and extending into slots 16 and 16' of bottom 4.

Fertilizer containers 17 and 18 suitably mounted on and secured in spaced apart relation to frame 6 extend longitudinally thereof and are centrally disposed over axle shaft 19 having traction wheels 20 and 21, respectively, fixed to ends 22 and 23 thereof. The fertilizer containers being centrally disposed over axle shaft 19 are evenly balanced irrespective of the quantity of fertilizer contained therein.

Vertical outer sides 24 and 25, respectively, of fertilizer containers 17 and 18, respectively, are in alinement with vertical outer ends 26 and 27 of hopper 1 positioned directly behind the containers. Longitudinal agitator shafts 28 and 29, respectively, rotatably mounted in bearings 30 and 31, respectively, carried by downwardly sloping bottom portions 32 and 33 of the fertilizer containers, have spaced apart outwardly extending integral fingers 34 and 35, respectively, fixed thereto to prevent packing of the fertilizer within the containers. Fixed to the front projecting ends, respectively, of the agitator shafts are gears in mesh with gears (not shown) at 38 and 39, respectively, fixed to front driving shaft 40 rotatably mounted in bearings suitably carried by frame 6.

Figure 3:
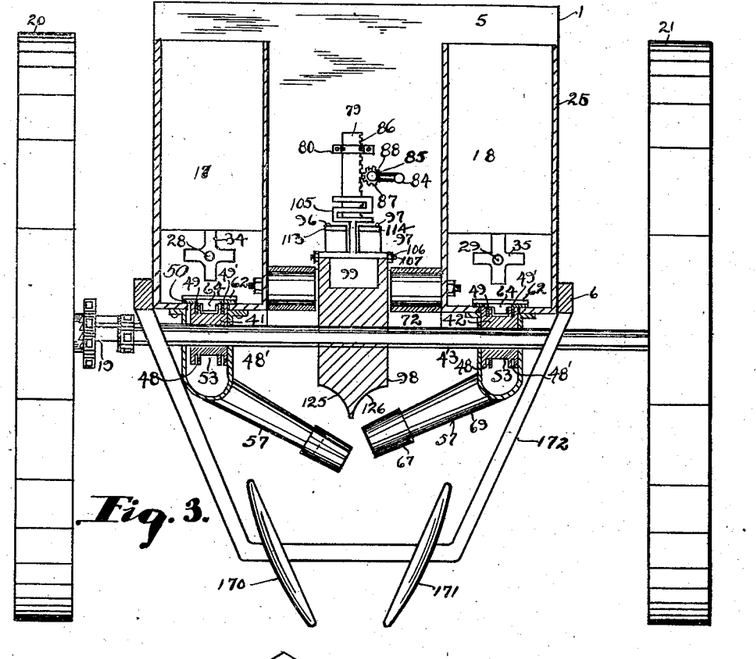
Fig. 3 is a vertical section taken on a line corresponding to 3—3 in Fig. 1 showing the cover plates in position and showing the shafts in side elevation.
Figures 4, 5:
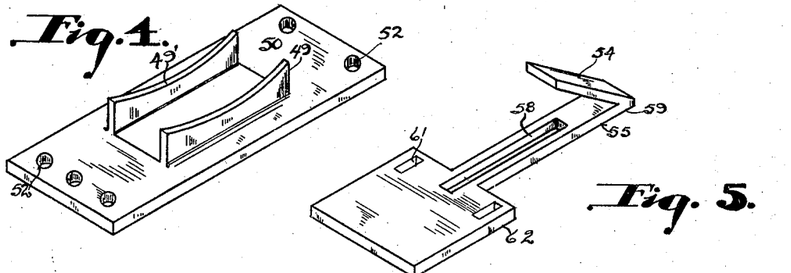
Fig. 4 is an inverted perspective of one of the cover plates.
Fig. 5 is a perspective of one of the fertilizer valves.
Figure 6:
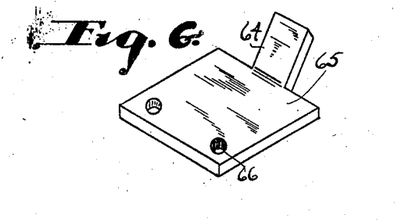
Fig. 6 is a perspective of one of the fertilizer wheel scrapers.
Figures 7, 8, 9, 10:
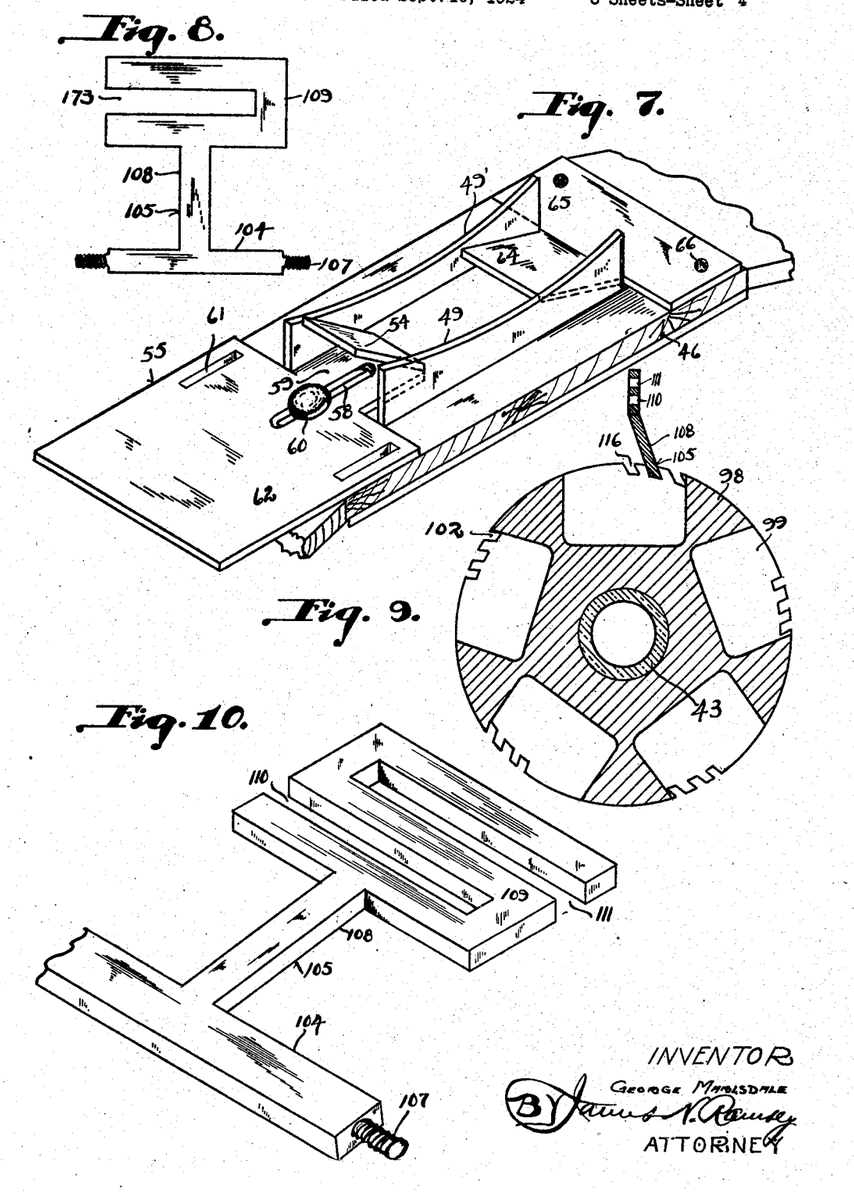
Fig. 7 is an inverted perspective showing the cover plate, fertilizer valve and fertilizer wheel scraper in an assembled position, with the bottom of the fertilizer container partly broken away.
Fig. 8 is a front elevation of one form of the potato carriers.
Fig. 9 is a central vertical section of the potato drum showing one form of the potato carriers in position.
Fig. 10 is a perspective showing a modified form of the potato carriers, and with one end of the base plate partly broken away.
Figures 11, 12:
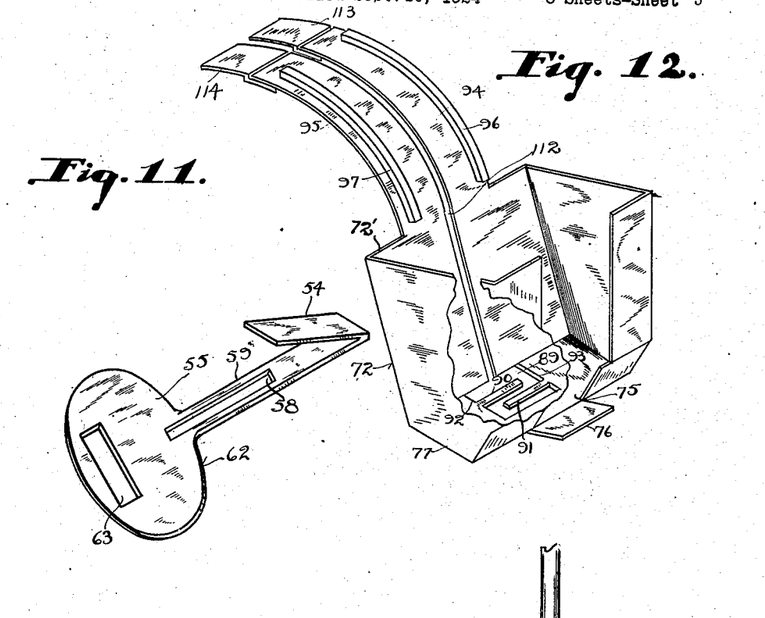
Fig. 11 is a perspective showing a modified form of the fertilizer valve.
Fig. 12 is a perspective of the potato bowl.

Fertilizer distributer wheels 41 and 42 are rotatably mounted in spaced apart relation on tubular main driving shaft 43 rotatably mounted on axle 19. The fertilizer distributer wheels 41 and 42, respectively, have their upper sides extending through openings 44 and 45, respectively, in the bottoms 46 and 47 of the fertilizer containers. Each fertilizer distributer wheel is similarly constructed and has annular grooves 48 and 48', in the outer periphery thereof for receiving downwardly extending flange 49 and 49', of cover plates 50 suitably fixed to bottoms 46 and 47, of containers 17 and 18 by bolts combinedly received through holes 52 in cover plates 50 and registering holes (not shown) in the bottoms of the containers, thereby preventing unintentional sifting or discharge of the fertilizer through openings 44 and 45 in the bottoms of the containers. Each fertilizer distributer wheel 41 and 42 has annular groove 53 intermediate annular grooves 48 and 48' for receiving end 54 of manually operative fertilizer hand valve 55 slidably mounted between the bottom of the fertilizer container and top 56 of fertilizer tube 57. Longitudinal slot 58 in shank 59 of valve 55 receives pin 60 combinedly received through the bottom of the fertilizer container and cover 50 for the purpose of providing manually operative means adapted to adjust the quantity of fertilizer distributed through tubes 57, respectively, fixed to bottoms 46 and 47 of the fertilizer containers. Valves 55 are maintained in slidable aligned position by suitable bolts received through slots 61 in handle 62 of the valves, shown in Figs. 4 and 7. In Fig. 11 I show a modified form of fertilizer valve 55 in which handle 62 is circular in form and provided with slot 63 for convenient manual operation of the valve. Scraper tongues 64 respectively integral with plates 65 fixed to bottoms 46 and 47, respectively, of fertilizer containers 17 and 18, are oppositely disposed from ends 54 of hand valves 55. Plates 62 may be fixed adjacent the outer surface of cover plates 50 as shown in Fig. 3, or adjacent the lower sides, respectively, of bottoms 46 and 47, of the containers, as shown in Fig. 7, by bolts combinedly received through holes 66 in plates 62 and through registering holes in the bottoms of the containers and holes 52 in cover plates 50. The scraper tongues 64, respectively, are adapted to engage the outer peripheries of fertilizer wheels 46 and 47 and within grooves 53 to prevent packing of the fertilizer within the grooves.

Figures 14, 15, 19:
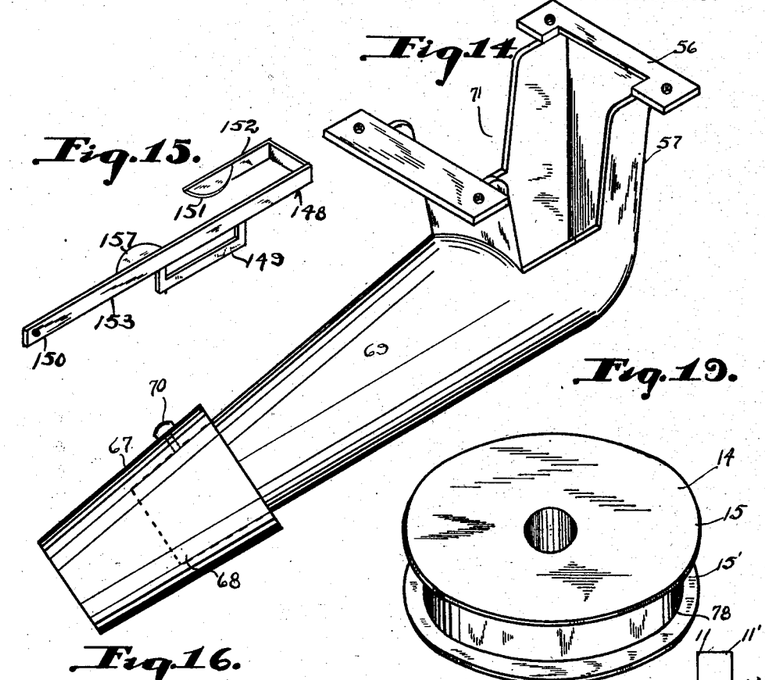
Fig. 14 is a perspective of the fertilizer tube.
Fig. 15 is a perspective of the clutch shifter.
Fig. 19 is a perspective of the feed wheel.

Each fertilizer distributing tube 57 is constructed similarly and comprises spout 67 adjustably connected to lower end 68 of body 69 by screw 70 for the purpose of enabling the operator to direct the flow of fertilizer at a desired position relative to the furrows in which the potatoes are planted. The upper end 56 of each fertilizer tube 57 is fixed to the lower side of bottoms 46 and 47, respectively, of the fertilizer containers and around opening 44 and 45, respectively, with the lower part of fertilizer wheels 41 and 42 fitting into the cut away upper part 71 of the tubes.

Aperture 13 in the lower portion of front 5 of hopper 1 has rotatable feed wheel 14 mounted with its upper periphery extending therein whereby potatoes are carried from the hopper through the aperture into bowl 72 fixed to the hopper between rear ends 73 and 74, respectively, of fertilizer containers 17 and 18. The bowl is provided with rear opening 75 having tongue 76 integrally connected to bottom 77 of the bowl and extending rearwardly in engagement with the outer periphery 78 of feed wheel 14 and between flanges 15 and 15', whereby the potatoes are guided into the bowl.

Vertical rack 79 slidably mounted in guides 80 fixed to front 5 of hopper 1 has its lower end 81 fixed to the upper part 82 of gate 83 whereby manual operation of handle 84 fixed to pinion 85 raises and lowers the gate as by external teeth 86 of rack 79 being in mesh with pinion 85 rotatably mounted at 87 on shaft 88 journaled in the front 5 of hopper 1. The elevated position of gate 83 governs the size of the potatoes admitted from the hopper into bowl 72 and is especially useful in regulating the number of potatoes deposited into the bowl over a given period of time.

Bottom 77 of bowl 72 has perforation 89 therein and in alinement with rear opening 75. Spaced apart and parallel pins 90 and 91, respectively, integrally connected with bottom 77 of the bowl extend transversely of the bottom, parallel thereto and partly across perforation 89 from oppositely disposed sides 92 and 93 thereof. The bowl is also provided with outwardly curved parallel and spaced apart upwardly extending fingers 94 and 95 integral with the rear side 72' of the bowl whereby the potatoes are carried, as hereinafter explained, upwardly and between curved rails 96 and 97, respectively, fixed to the outer edges of fingers 94 and 95 for the purpose of maintaining the potatoes on the fingers.

Circular drum 98 fixed to tubular main driving shaft 43 is in alinement with feed wheel 14 and has equi-distant spaced apart pockets 99 in the outer periphery thereof. The outer walls 100 and 101, respectively, of the pocket has a plurality of alined inclined slots 102 and 103 therein for receiving bases 104 of carriers 105. Each base is secured into the slots by suitable means, as by nuts 106 threaded to integral bolts 107 of the base and tightened in engagement with the outer sides of walls 100 and 101 of the pockets.

Each carrier 105 has outwardly or rearwardly bent shank 108 extending in alinement with base 104 and has plate 109 integral with its upper end and extending at an angle with the shank. The object in having shank 108 and base 104 of each carrier 105, extending at an angle to plate 109, is to provide an exit from pockets 99 having considerably greater area than the entrance, thereby assuring that irregular formed potatoes will drop from the pockets.

Plates 109 of the carriers are provided with spaced apart parallel slots 110 and 111, respectively, adapted to register with pins 90 and 91 in bottom 77 of bowl 72, when the base 104 is properly adjusted in slots 102 and 103, whereby potatoes are conveyed from the bowl over fingers 94 and 95 and dropped into pockets 99 of drum 98. The upward movement of plate 109 over fingers 94 and 95 is permitted by shank 105 of the carrier traveling through slot 112 in bowl 72.

Extension plates 113 and 114, respectively, detachably fixed to the upper end of fingers 94 and 95, by screws 115, are attached thereto when small pieces of potatoes are being planted and bases 104 of the carriers are then positioned in forward slots 116 (or the slots to the rear, depending upon the size of the potatoes) whereby only one potato is permitted to drop in each pocket 99 at a time. Gate 83 also is lowered to regulate the number of potatoes admitted from the hopper into the bowl. When whole potatoes are being planted bases 104 of carriers 105 are secured into suitable slots to the rear of forward slot 116; and extension plates 113 and 114, respectively, are detached from fingers 94 and 95 and gate 83 is raised to permit the potatoes to pass through aperture 13 in front 5 of the hopper, and for the purpose of regulating the number of potatoes deposited in bowl 72 over a given period of time.

Spaced apart parallel curved and upwardly extending fingers 117 and 118, respectively, suitably fixed adjacent shafts 119 and 120, respectively, fixed adjacent inner sides 121 and 122, respectively, of fertilizer containers 17 and 18, are for the purpose of maintaining potatoes within pockets 99 of drum 98 until the pockets are rotated to a point adjacent lower ends 123 of fingers 117 and 118, at which point the potatoes are permitted to fall in equi-distant spaced apart relation into furrows made by usual plow 124.

It is especially advantageous to adjust the lower ends of fingers 117 and 118 so that the potatoes fall directly behind the plow thereby depositing the potatoes into the furrows before any part of the earth removed therefrom falls into the bottom of the furrows from the sides thereof.

When more than one potato is carried from bowl 72 by a carrier 105, and base 104 of the carrier is positioned in the proper slots 101 and 102, the excess potatoes, more than one, are adapted to be diverted by concave surfaces 125 and 126 (intermediate pockets 99) onto endless belts 127 and 128, respectively, mounted on rollers 129 and 130 suitably mounted in ears 129' and 130', respectively, fixed to the front and rear of inner sides 121 and 122, respectively of fertilizer container 17 and 18. Each front roller 129 has gear 131 fixed thereto and in mesh with gear 132 fixed to front driving shaft 40, whereby the belts are driven and adapted to carry the excess potatoes to bowl 72 where they again are adapted to be conveyed therefrom by carriers 105 and deposited into pockets 99 of drum 98. The exact position of rollers 129 and 130 is not important, inasmuch as their location may be varied with the height and size of bowl 72, the object being to adapt the potatoes to fall from belts 127 and 128 into the bowl.

Figure 2:
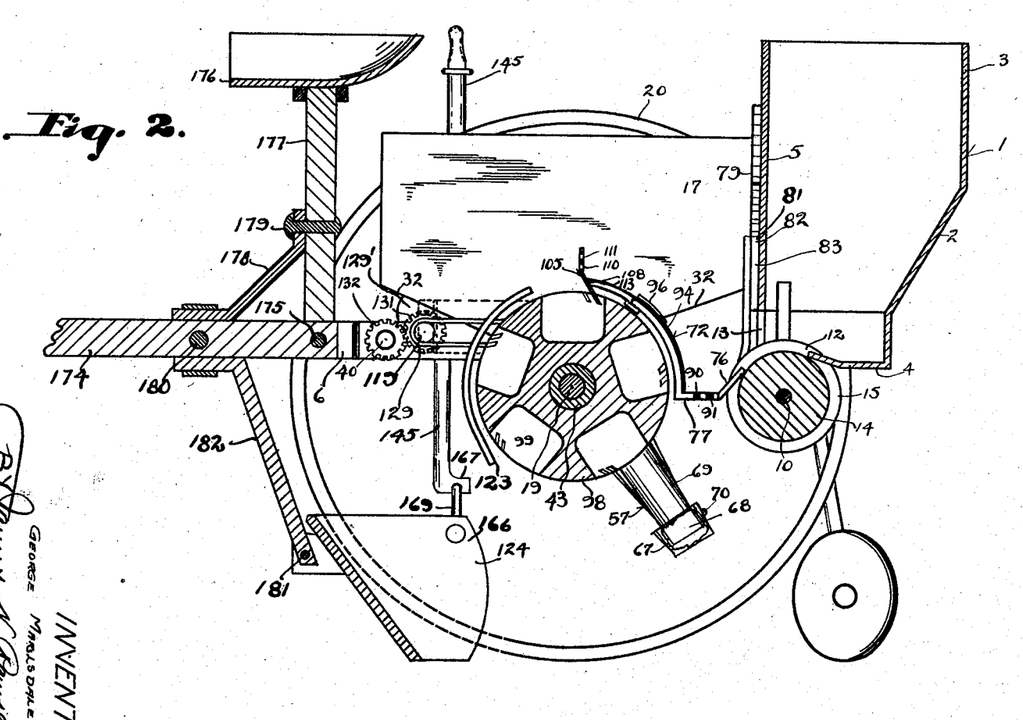
Fig. 2 is a vertical section taken on a line corresponding to 2—2 in Fig. 1.
Figures 16, 17, 18:
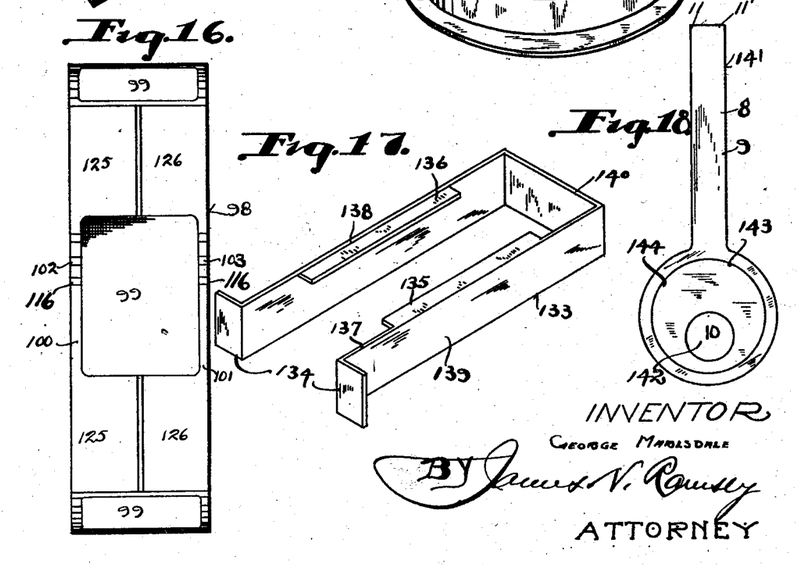
Fig. 16 is a front elevation of the potato drum.
Fig. 17 is a perspective of the belt carrier.
Fig. 18 is a perspective of the rear driving shaft eccentric.

Belt carrier 133 shown in perspective in Fig. 17, and in dotted lines in Fig. 2, has ends 134 suitably fixed to bowl 72, as by welding. Longitudinal plates 135 and 136, respectively, are suitably fixed to top edges 137 and 138 of the belt carrier and extend inwardly and at right angles to sides 139 and 140 thereof, whereby the excess potatoes, that drop from concave surfaces 125 and 126 of drum 98, are maintained against wedging between belts 127 and 128, respectively, and the sides of drum 98. Sides 139 and 140 of belt carrier 133 also prevent the potatoes grinding against the sides of the drum when being conveyed to bowl 72. Fingers 117 and 118, respectively, may be fixed to sides 139 and 140 of the belt carrier having its rear end 141 suitably supported, as by having sides 139 and 140, respectively, fixed to the outer ends of rollers 129.

Arms 8 and 8', respectively, of eccentrics 9 and 9' (exemplified by 141 in Fig. 18) respectively extend upwardly through holes 7 and 7' in hopper 1, whereby rotation of rear driving shaft 10 (received in holes 142 and fixed to discs 143 rotatably mounted in bearings 144 respectively integral with the lower ends of arms 7 and 7') causes the upper ends of the arms to move slowly circularly, as heretofore explained, for the purpose of preventing the potatoes bridging and becoming clogged in the hopper.

Front driving shaft 40, main driving shaft 43 and rear driving shaft 10 may have any suitable gear connection with axle 19, fixed to wheels 20 and 21, for the purpose of rotating the shafts.

The mechanism which I show for rotating rear driving shaft 10 main driving shaft 43 and front driving shaft 40 comprises manually operative hand lever or handle 145 pivotally connected at 146 with extension 147 of frame 6. Clutch shifter 148 is slidably mounted, longitudinally and has axle 19 received in slot 149. End 150 of the clutch shifter is pivotally connected with lever 145 at a point above pin 146, whereby the clutch shifter is adapted to be moved a sufficient distance, and in the proper direction, to accomplish the desired purposes of forming and disconnecting gear connections between axle 19 and the driving shafts. Forward movement of handle 145 causes semi-circular boss 151 (integral with front end 152 spaced apart from and parallel with body 153 of clutch shifter 148) to engage the outer side of sprocket wheel 154 and slide it inwardly. Sprocket wheel 154 is slidably keyed to main driving shaft 43 and has clutch member 155 fixed to the outer side thereof and adapted to engage clutch member 156 fixed to axle 19 adjacent wheel 20. Rearward movement of handle 145 causes semi-circular boss 157, fixed to body 153 of clutch shifter 148 to engage the inner side of sprocket wheel 154 simultaneously with disengagement of semi-circular boss 151 from the outer side thereof, whereby clutching engagement of teeth 158 and 159, respectively, of clutch members 155 and 156 is completed. Sprocket wheel 154 has gear connections, through suitable belt or chain 160, with sprocket wheel 160' fixed to rear driving shaft 10, whereby the rear driving shaft is rotated and thereby rotating sprocket wheel 161 fixed to rear driving shaft 10 and adjacent sprocket wheel 160'. Sprocket wheel 161 has gear connections with sprocket wheel 162 (by suitable belt or chain 162) fixed to front driving shaft 40, whereby the front driving shaft is rotated. Handle 145 may have any suitable connection with guard 164, fixed to frame extension 147 by bolts 165, whereby the handle is releasably maintained in its position for the purpose of maintaining clutch members 155 and 156 in or out of engagement with each other.

Simultaneously with the forward movement of handle 145, whereby the clutch members 155 and 156 are adapted to be thrown out of mesh, plow 124 is adapted to be automatically raised from engagement with the ground as by elevation of rear end 166 of the plow through connection of rearwardly bent lower end 167 of handle 145 having connection with forward end 168 of the plow through bar 169 combinedly fixed to lower end 167 and forward end 168, respectively of handle 145 and plow 124. It is advantageous to provide mechanism adapted to automatically and simultaneously lower plow 124 in engagement with the ground when clutch members 155 and 156 are actuated into meshing engagement with each other for the reason that one of the chief advantages of my invention is that only one man is necessary to operate it.

Disks 170 and 171 rotatably mounted on shaft 172, suitably fixed to frame 6, are for the purpose of automatically covering the potatoes with dirt after they are dropped from pockets 99 in drum 98 and fertilizer is distributed over them by fertilizer tubes 57. Suitable mechanical means (not shown) may be utilized for the purpose of raising and lowering disks 170 and 171. The mechanism for raising and lowering disks 170 and 171 and plow 124, not being an essential part of my invention, may comprise usual construction well known in the art to which my invention relates.

Figure 1:
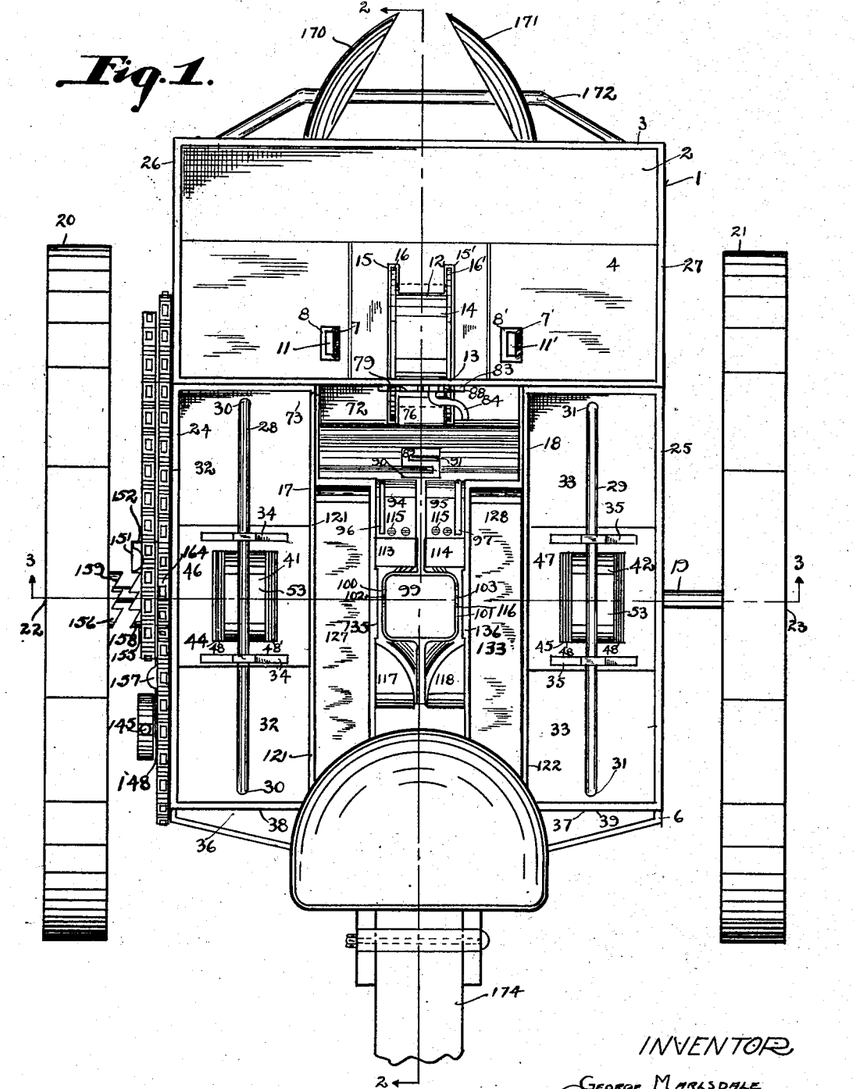
Fig. 1 is a plan view of my invention with the cover plates removed.

In Figs. 8 and 10 I show modified forms of carriers 105. In Fig. 8 the carrier has a single slot 173 therein and which when used for the purpose of elevating potatoes from the bottom 77 of bowl 72 may necessitate a change in the construction of pins 90 and 91, as shown in aperture 89, in Fig. 1. In Fig. 10 I show slots 110 and 111 positioned differently. I merely show the modification of carrier 105 in Figs. 8 and 10 for the purpose of emphasizing the fact that various constructions of plate 109 may be applied to the carriers and that the all important requirement of the carriers is to provide a construction which is adapted to permit plate 109 to pass through perforation 89 (in bottom 77 of bowl 72) having means to prevent the potatoes from falling therethrough from the bowl. The number of slots 102 and 103 in the walls of pockets 99 is dependent upon the variation in the size of potatoes desired to be planted. In Fig. 1 I show pockets 99 having equal length and breadth and in Fig. 16 I show a pocket having considerably greater length than breadth. While I prefer the pockets to be constructed as shown in Fig. 16 in which the length taken around the outer periphery of drum 98 is greater than the distance transversely across the drum, as heretofore explained, the shape of pockets 99 may be considerably varied for the purpose of accommodating potatoes of various sizes.

Tongue 174 is suitably fixed to frame 6 by bolt 175 combinedly received through the tongue and the frame. Seat 176 is adapted to carry the operator of my invention and may be of any convenient design and is positioned on suitable post 177 fixed to tongue 174 by bolt 175 and is supported in its upright position by brace 178 combinedly fixed to vertical post 177 and tongue 174, respectively, by bolts 179 and 180.

The operation of the mechanism of my invention is as follows:

Assume hopper 1 contains potatoes and fertilizer containers 17 and 18 contain fertilizer and that suitable animals or a power tractor is connected with tongue 174 of my invention. Forward manual operation of lever 145 causes clutch member 155 to engage clutch member 156, through mechanism heretofore explained whereby rear driving shaft 10, main driving shaft 43 and front driving shaft 40 are caused to rotate. Forward movement of handle 145 simultaneously lowers plow 124 upon the ground through usual mechanism heretofore explained which comprises lower end 167 of handle 145 having connection with rear end 166 of the plow through rod 169, and the front end of the plow being pivotally connected at 181 to arm 182 having its upper end fixed to tongue 174.

Arms 8 and 8', extending upwardly through holes 7 and 7' in the bottom of hopper 1, have eccentric connection with rear driving shaft 10 and prevent potatoes in the hopper from bridging or clogging thereby assuring a continuous supply of potatoes in engagement with feed wheel 14 fixed to the rear driving shaft. The feed wheel has its upper periphery extending through aperture 12 in the bottom of the hopper, whereby the potatoes are carried into bowl 72 through aperture 13 in front 5 of the hopper and onto pins 90 and 91 integral with bottom 77 of the bowl and extending parallel thereto and inwardly from the edges of perforation 89. Slotted plates 109 of carrier 105 project outwardly and are integrally connected to bases 104 fixed in slots 102 and 103 of the walls of pockets 99 in rotatable drum 98 fixed to tubular main driving shaft 43, whereby the potatoes are carried singly upwardly over fingers 94 and 95 as by plates 109 passing upwardly through perforation 89 in bottom 77 of the bowl and shanks 108 of the carriers passing through slot 112 in the rear wall. When plates 109 arrive at a predetermined point the potatoes are adapted to drop into pockets 99. The potatoes are retained in the pockets by curved fingers 117 and 118 until the pockets travel to the lower ends 123 of the plates where they are permitted to fall from the pockets and into furrows directly behind plow 124. Fertilizer is simultaneously distributed into the furrows at predetermined positions by spout 67 adjustably secured to the lower end of tubes 57 respectively fixed to the bottom of fertilizer containers 17 and 18. Manual operation of fertilizer valves 62 regulate the quantity of fertilizer discharged from tubes 57 over a given period of time.

Inwardly curved disks 170 and 171, journaled to shaft 172 suitably fixed to frame 6, engage the ground and are positioned to the rear of the frame, whereby the potatoes and fertilizer is simultaneously covered by earth drawn from the sides of the furrow previously made by plow 124, whereby my invention automatically plows furrows, distributes fertilizer, drops potatoes and covers the potatoes and fertilizer with earth.

Figure 13:
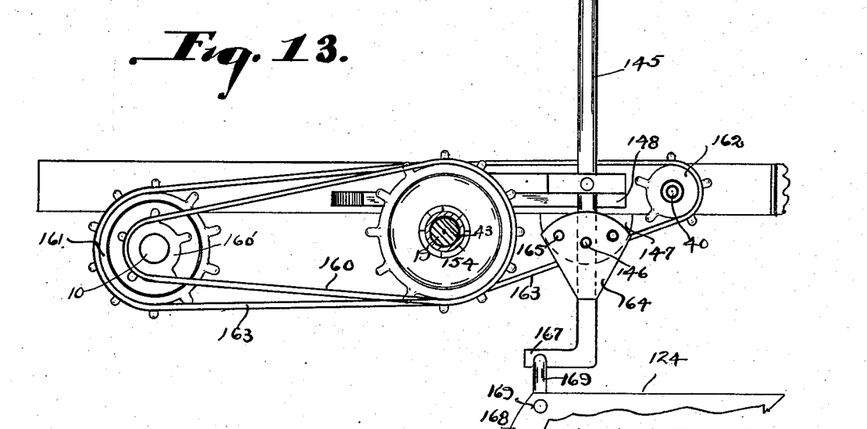
Fig. 13 is a side elevation showing the main driving shaft, rear driving shaft and front driving shaft gear mechanism.

Pockets 99 in drum 98 being in equi-distant spaced apart relation in the outer periphery of the drum, and in combination with fingers 117 and 118 drop the potatoes on the ground in equi-distant spaced apart relation. The distance between the potatoes, when dropped upon the ground, may be regulated by increasing or reducing the number of pockets in the potato drum as well as increasing or reducing the rotatable speed of drum 98 through the gearing connections shown in Fig. 13.

It is apparent that I have invented a practical, efficient, economical, and highly desirable potato planter which requires the services of but one man for its operation.

While I have chosen to illustrate the form of construction of my invention by the herein drawings and explanations of the same, I desire to emphasize the fact that the form and the explanation as relates thereto, are not intended to include the various forms of modification, in which my invention may be incorporated. It is understood that my invention resides in the combination, arrangement of parts and the details of construction, as hereinafter claimed, and that changes in the precise embodiment of the invention as herein disclosed can be made within the scope of what is claimed without departing from the spirit of the invention.

What I claim as new and desire to secure by Letters Patent is:

1. A potato planter having a main driving shaft and a frame, a hopper mounted on said frame, having an aperture therein, a rear driving shaft journaled in said frame, means connecting said main driving shaft and said rear driving shaft whereby the rear driving shaft is rotated, a feed wheel fixed to said rear driving shaft and the upper side thereof extending into said aperture, a drum mounted on said main driving shaft and having a plurality of spaced apart pockets in the outer periphery thereof and having outwardly tapered concave surfaces adjacent said pockets, longitudinal shanks adapted to be secured in said drum, a carrier integral with each of said shanks, a bowl fixed to said hopper and having a hole intermediate and adjacent the rear of said drum and the front of said feed wheel, and means whereby rotation of said drum is adapted to drop the potatoes issuing from said hopper into said bowl.

2. A potato planter comprising a main driving shaft, a frame, a hopper mounted on said frame and having an aperture therein and extending into the front of said hopper, a rear driving shaft, means connecting said main driving shaft and said rear driving shaft whereby the rear driving shaft is rotated, a feed wheel fixed to said rear driving shaft and the upper side thereof extending into said aperture, a drum mounted on said main driving shaft and having a plurality of equi-distant spaced apart pockets in the outer periphery thereof, a carrier detachably secured to said drum, a bowl fixed to said hopper and having a hole therein, and a pair of pins fixed in said bowl and extending inwardly into said hole.

3. A potato planter comprising a main driving shaft, a hopper mounted on the frame of said planter and having an aperture in the bottom thereof and extending into the front of the hopper, a rear driving shaft journaled in said frame, means connecting said main driving shaft and said rear driving shaft whereby the rear driving shaft is rotated, a feed wheel fixed to said rear driving shaft and the upper side thereof extending through said aperture, a drum fixed to said main driving shaft and having a plurality of spaced apart pockets in the outer periphery thereof and having outwardly tapered concave surfaces intermediate said pockets and having a slot adjacent each of said pockets, longitudinal shanks adapted to be secured in each of said slots, respectively, a carrier integral with each of said shanks and having a pair of parallel spaced apart transverse slots therein, a bowl fixed to said hopper intermediate said containers and having a pair of curved fingers integral therewith and extending part way around said circular drum and having a hole intermediate and adjacent the rear of said drum and the front of said feed wheel.

4. A potato planter comprising a main driving shaft, a frame, a potato hopper mounted on said frame having an aperture therein, a rear driving shaft, means connecting said main driving shaft and said rear driving shaft whereby the rear driving shaft is rotated, a feed wheel mounted on said rear driving shaft and the upper side thereof extending into said hopper, and a drum fixed to said main driving shaft and having a plurality of equi-distant spaced apart pockets in the outer periphery thereof and having outwardly tapered concave surfaces intermediate said pockets, longitudinal shanks adapted to be detachably secured adjacent said pockets, respectively, and a carrier integral with each of said shanks and adapted to convey potatoes to said drum.

5. A potato planter comprising a main driving shaft, a frame, a potato hopper having an aperture therein, a rear driving shaft, a feed wheel rotatably mounted on said rear driving shaft and extending through said aperture, a bowl adjacent said hopper and having a hole therein and adapted to receive potatoes from said feed wheel, a drum rotatably mounted on said main driving shaft, a carrier detachably fixed to said drum and a portion thereof adapted to register with said hole and adapted to convey potatoes from said bowl to said drum and means to release potatoes from said drum.

6. A potato planter comprising a main driving shaft, a frame, a potato hopper having an aperture therein, a rear driving shaft, feeding means extending through said aperture, a bowl adjacent said hopper and adapted to receive potatoes from said feeding means, a potato distributer mounted on said main driving shaft, a carrier fixed to said distributer and adapted to convey potatoes from said bowl to said distributer and means to release potatoes from said drum.

7. A potato planter comprising a main driving shaft, a frame, a potato hopper having an aperture therein, a rear driving shaft, feeding means extending through said aperture and comprising a flanged wheel rotatably mounted on said rear driving shaft, a bowl adjacent said hopper and adapted to receive potatoes from said feeding means, a potato distributer mounted on said main driving shaft and comprising a drum having a pocket in the outer periphery thereof, a carrier fixed to said distributer and adapted to convey potatoes from said bowl to said distributer, and means to release deposited potatoes from said drum.

8. A potato planter comprising a main driving shaft, a frame, a hopper mounted on said frame, a drum mounted on said main driving shaft and having a pocket therein, a carrier detachably fixed to said drum and adjacent said pocket, a bowl fixed to said hopper and adapted to receive potatoes from said hopper whereby said carrier is adapted to convey said potatoes to said pocket in said drum wherefrom said potatoes are distributed in spaced apart relation on the ground under said planter.

9. A potato planter comprising a main driving shaft, a frame, a hopper mounted on said frame, a potato distributer mounted on said main driving shaft and comprising a drum having a plurality of equi-distant spaced apart pockets therein, a plurality of carriers detachably fixed to said drum and adjacent said pockets, respectively, a bowl fixed to said hopper and adapted to receive potatoes from said hopper whereby said carriers are adapted to convey said potatoes to said pockets in said drum wherefrom said potatoes are distributed in spaced apart relation on the ground under said planter.

10. A potato planter comprising a main driving shaft, a frame, a hopper mounted on said frame, a potato distributer mounted on said main driving shaft and comprising a drum having a plurality of equi-distant spaced apart pockets therein, tapered surfaces intermediate said pockets and adapted to permit surplus potatoes to fall from said drum, a plurality of carriers detachably fixed to said drum and adjacent said pockets respectively, a bowl fixed to said hopper and adapted to receive potatoes from said hopper whereby said carriers are adapted to convey said potatoes to said pockets in said drum wherefrom said potatoes are distributed in spaced apart relation on the ground under said planter.

11. A potato planter comprising a frame, a main driving shaft, a rotatable drum mounted on said shaft and having equi-distant spaced apart pockets therein and having outwardly tapering concave ridges alternating intermediate said pockets, and having perforations in the walls of each of said pockets, a shank adapted to be secured in each of said perforations, respectively, a carrier integral with said shank and having a transverse slot therein and means for supplying potatoes to said carrier and said carrier adapted to deposit said potatoes in said pockets, substantially as and for the purposes specified.

12. A potato planter comprising a frame, a main driving shaft, a rotatable drum mounted on said shaft and having equi-distant spaced apart pockets therein and having outwardly tapering concave ridges alternating intermediate said pockets, and having perforations in the walls of each of said pockets, a shank adapted to be secured in each of said perforations, respectively, a carrier integral with said shank and having a slot therein and means for supplying potatoes to said carrier and said carrier adapted to deposit said potatoes in said pockets, substantially as and for the purposes specified.

13. A potato planter comprising a frame, a rotatable drum having equi-distant spaced apart pockets therein and having outwardly tapering concave ridges alternating intermediate said pockets, and having perforations in the walls of each of said pockets, a shank adapted to be secured in each of said perforations, respectively, a carrier integral with said shank and means for supplying potatoes to said carrier comprising a feed wheel fixed to said rear driving shaft and extending into said aperture, and said carrier adapted to deposit said potatoes in said pockets, substantially as and for the purposes specified.

14. A potato planter comprising a frame, a main driving shaft, a rear driving shaft having gear connection with said main driving shaft, a hopper mounted on said frame and having an aperture therein, a rotatable drum mounted on said shaft and having equi-distant spaced apart pockets therein and having outwardly tapering concave ridges alternating intermediate said pockets, and having perforations in the walls of each of said pockets, a shank adapted to be secured in each of said perforations, respectively, a carrier integral with said shank and means for supplying potatoes to said carrier comprising a feed wheel fixed to said rear driving shaft and extending into said aperture and said carrier adapted to deposit said potatoes in said pockets, substantially as and for the purposes specified.

15. A potato planter comprising a frame, a main driving shaft, a rotatable drum mounted on said shaft and having equi-distant spaced apart pockets therein, a shank adapted to be secured adjacent each of said pockets, respectively, a carrier integral with said shank and means for supplying potatoes to said carrier comprising a feed wheel fixed to said rear driving shaft and extending into said aperture and said carrier adapted to deposit said potatoes in said pockets, substantially as and for the purposes specified.

16. A potato planter comprising a frame, a main driving shaft, a rear driving shaft mounted on said frame, a rotatable drum mounted on said shaft and having equi-distant spaced apart pockets therein, a shank adapted to be secured adjacent each of said pockets, respectively, a carrier integral with said shank and means for supplying potatoes to said carrier comprising a feed wheel fixed to said rear driving shaft and said carrier adapted to deposit said potatoes in said pockets, substantially as and for the purposes specified.

17. A potato planter comprising a frame, a main driving shaft, a rear driving shaft mounted on said frame and having gear connection with said main driving shaft, a hopper mounted on said frame and having an aperture therein, a rotatable drum mounted on said shaft and having equi-distant spaced apart pockets therein, a shank adapted to be secured adjacent each of said pockets, respectively, a carrier integral with said shank and means for supplying potatoes to said carrier comprising a feed wheel fixed to said rear driving shaft and extending into said aperture and said carrier adapted to deposit said potatoes in said pockets, substantially as and for the purposes specified.

18. A potato planter comprising a frame, a main driving shaft mounted on said frame, a rotatable drum mounted on said shaft and having spaced apart pockets therein, a shank adapted to be secured adjacent each of said pockets, respectively, a carrier integral with said shank and means for supplying potatoes to said carrier comprising a feed wheel fixed to said rear driving shaft and said carrier adapted to deposit said potatoes in said pockets, substantially as and for the purposes specified.

19. A potato planter comprising a frame, a main driving shaft, a rear driving shaft mounted on said frame and having gear connection with said main driving shaft, a hopper mounted on said frame and having an aperture therein, a rotatable drum mounted on said shaft and having spaced apart pockets therein, a shank adapted to be secured adjacent each of said pockets, respectively, a carrier integral with said shank and means for supplying potatoes to said carrier comprising a feed wheel fixed to said rear driving shaft and extending into said aperture and said carrier adapted to deposit said potatoes in said pockets, substantially as and for the purposes specified.

20. A potato planter comprising a frame, a main driving shaft, a rear driving shaft mounted on said frame, a hopper mounted on said frame and having an aperture therein, a rotatable drum mounted on said shaft and having spaced apart pockets therein, a shank adapted to be secured adjacent each of said pockets, respectively, a carrier integral with said shank and means for supplying potatoes to said carrier comprising a feed wheel fixed to said rear driving shaft and extending into said aperture, a bowl adapted to receive potatoes from said feed wheel, said carrier adapted to receive the potatoes from said bowl and deposit them in said pockets, and a curved plate fixed adjacent the outer periphery of said drum and extending part way therearound and adapted to retain said potatoes in said pockets until said pockets respectively, are positioned below the lower end of said plate, substantially as and for the purposes specified.

21. A potato planter comprising a frame, a main driving shaft, a rear driving shaft mounted on said frame and having gear connection with said main driving shaft, a hopper mounted on said frame and having an aperture therein, a rotatable drum mounted on said shaft and having equi-distant spaced apart pockets therein, a shank adapted to be secured adjacent each of said pockets, respectively, a carrier integral with said shank and means for supplying potatoes to said carrier comprising a feed wheel fixed to said rear driving shaft and extending into said aperture, a bowl adapted to receive potatoes from said feed wheel, said carrier adapted to receive the potatoes from said bowl and deposit them in said pockets, and a curved plate fixed adjacent the outer periphery of said drum and extending part way therearound and adapted to retain said potatoes in said pockets until said pockets, respectively, are positioned below the lower end of said plate, whereby said potatoes are distributed in equi-distant spaced apart relation on the ground beneath said planter.

GEORGE MARLSDALE.